United States Patent
Martinell

(10) Patent No.: US 6,174,107 B1
(45) Date of Patent: Jan. 16, 2001

(54) DEVICE FOR CREATION OF AN OXIDATION AND PRECIPITATION ZONE OR A REDUCTION ZONE IN AN AQUIFER

(75) Inventor: Rudolf Martinell, deceased, late of Täby (SE), by Per Martinell, Judit Martinell, Ann Hagg-Martinell, legal representatives

(73) Assignee: Hydrophilia AB (SE)

( * ) Notice: Under 35 U.S.C. 154(b), the term of this patent shall be extended for 0 days.

(21) Appl. No.: 09/125,613
(22) PCT Filed: Feb. 21, 1996
(86) PCT No.: PCT/SE96/00238
§ 371 Date: Oct. 21, 1998
§ 102(e) Date: Oct. 21, 1998
(87) PCT Pub. No.: WO97/30942
PCT Pub. Date: Aug. 28, 1997

(30) Foreign Application Priority Data

Feb. 21, 1996 (SE) .......................................... 62924

(51) Int. Cl.[7] ................. A62D 3/00; C02F 1/64; C02F 1/70; C02F 1/72
(52) U.S. Cl. ............... 405/128; 166/52; 166/269; 210/747
(58) Field of Search ................ 166/268, 269, 166/270, 52; 405/128; 210/747, 615, 712

(56) References Cited

U.S. PATENT DOCUMENTS

| 3,878,097 | * | 4/1975 | Mochizuki et al. | 210/151 |
| 5,006,250 | * | 4/1991 | Roberts et al. | 210/610 |
| 5,246,309 | * | 9/1993 | Hobby | 405/128 |
| 5,362,400 |   | 11/1994 | Martinell | 210/717 |
| 5,885,775 | * | 6/1999 | Kerfoot | 210/170 |

* cited by examiner

Primary Examiner—George Suchfield
(74) Attorney, Agent, or Firm—Ostrolenk, Faber, Gerb & Soffen, LLP

(57) ABSTRACT

The invention refers to a device for creating in an aquifer an oxidation and precipitation zone or a reduction zone between a number of injection wells arranged around one or more extraction wells for purified water, said injection wells each comprising an outer water-pervious tube (1). For preventing such a device from being clogged the invention suggests that at the upper end of the outer tube (1) is mounted a circulation vessel (2) from which extends downwardly within the outer tube (1) a first conduit (3), ending at the height of the upper portion of the aquifer and provided with a pressure inlet means (5) so as to form an upper ejector, and a second conduit (4), which at its lower end supports an externally sealingly mounted balloon body (7), which is inflatable into sealing engagement with the inner surface of the outer tube (1), said second conduit closely above said body carrying a pressure inlet means (6), so as to form a second ejector.

7 Claims, 1 Drawing Sheet

DEVICE FOR CREATION OF AN OXIDATION AND PRECIPITATION ZONE OR A REDUCTION ZONE IN AN AQUIFER

BACKGROUND OF THE INVENTION

The present invention refers to a device for carrying-out of the process according to claim 1 of the publication print WO 92/00918, i.e. for creating in an aquifer an oxidation and precipitation zone or a reduction zone between a number of injection wells arranged around one or more extraction wells for purified water, which zone is intended for in situ precipitation or reduction of substances not desired in the ground water, the desired zone being created intermittently between each pair of adjacent injection wells by (i) introducing oxygen, oxygen-containing gas or an oxygen-releasing substance into the water in both wells when creating an oxidation and precipitation zone, or introducing into the water in both wells an oxygen-consuming substance when creating a reduction zone, and (ii) pumping the water in one of the wells from below upwards while pumping the water in the other well from above downwards whereby a circulation circuit is formed in the aquifer between the two wells, said injection wells each comprising an outer tube which at least at the ground-water carrying portion of its length is apertured and water-pervious.

The prior device suggested according to the WO 92/00918 has shown to operate satisfactorily in a number of applications. In some cases where the ground-water has been "troublesome" and severely mingled with contaminants it has turned out that the ejectors have become rather severely clogged such that the process has been slowed down. Particularly the re-directing zones in the gaps between the various tubes have been clogged. The outer tube exhibits only one internal surface in contact with the water while the inner tube is surrounded by the "troublesome" water both internally and externally. In the annular spaces between the tubes there are thus formed deposits both at the outer and inner surfaces so that they will be heavily clogged and the flow restricted. Furthermore, it has turned out to be difficult to flush away or otherwise get rid of said deposits due to the relatively small tube diameter of the injection wells.

SUMMARY OF THE INVENTION

The object of the present invention thus is to eliminate said disadvantage by means of a differently designed device for this purpose. The invention is essentially distinguished in that at the upper end of the outer tube is mounted a circulation vessel from which extends downwardly within the outer tube on one hand a first conduit, ending at the height of the upper portion of the aquifer and slightly above its mouth being provided with a pressure inlet means so as to form an upper ejector, and at the other a second conduit, which ends at or below the middle of the aquifer and at its lower end supporting an externally sealingly mounted balloon body, which is inflatable into sealing engagement with the inner surface of the outer tube, said second conduit closely above said body carrying a pressure inlet means, so as to form a second ejector, both pressure inlet means and the balloon body being connected with one or more suitable pressure sources.

BRIEF DESCRIPTION OF THE DRAWINGS

The invention will be described further below with reference to the accompanying drawing, in which in FIG. 1 is illustrated a diagrammatic axial section through a pair of wells

DESCRIPTION OF A PREFERRED EMBODIMENT

Figure 1:
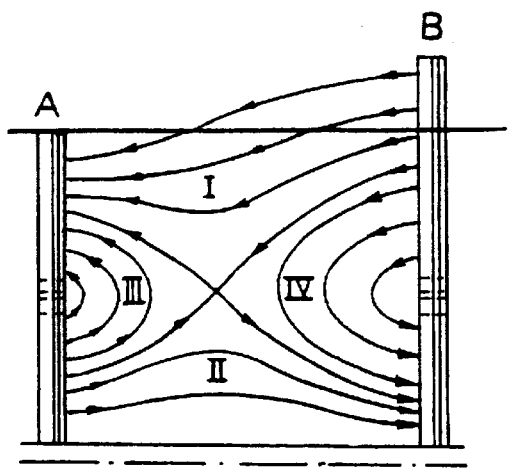
Figure 2:
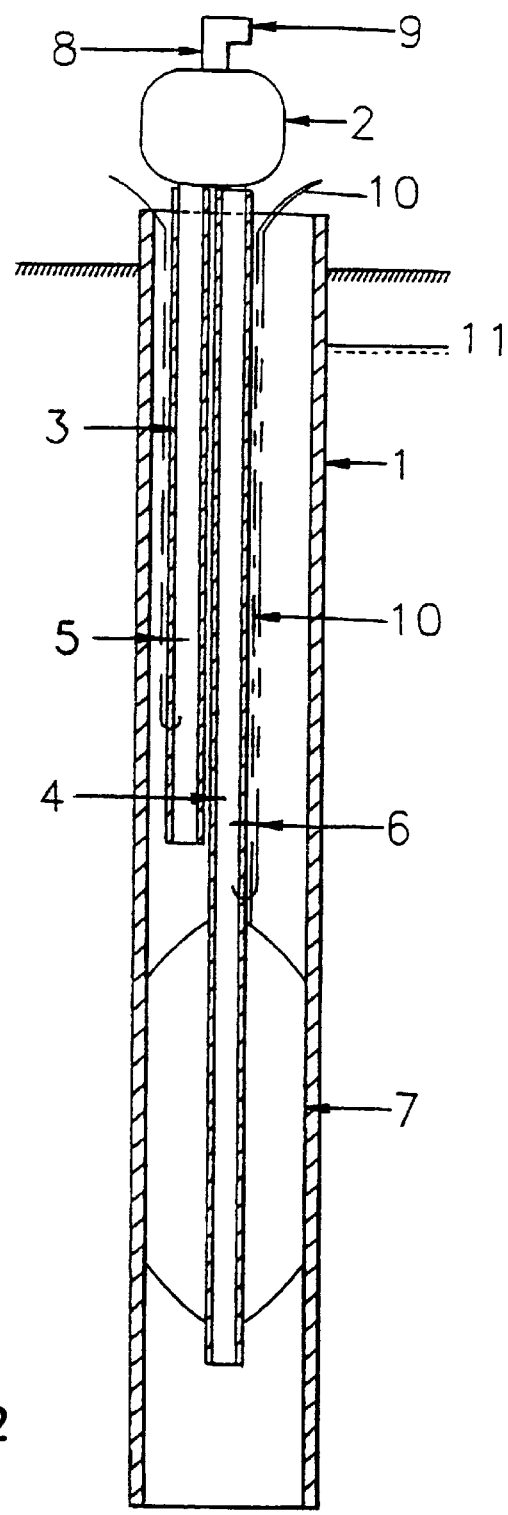
FIG. 2 is a longitudinal section through a device according to the invention.

In the drawings it is thus shown an outer tube 1 which preferably is cylindrical and introduced into the ground which at least in the ground-water carrying portion which starts at the ground-water level 11, and over portion of its length is apertured and thus water-permeable. In the upper portion of said tube 1 is at/or above the ground surface mounted a circulation vessel 2 from which extends downwardly within the outer tube 1 a first conduit 3 which ends at the height of the upper portion of the aquifer. Slightly above its mouth said conduit 3 is provided with a pressure inlet means 5 so as to form an upper ejector. Furthermore, downwardly within the outer tube 1 extends a second conduit 4, which ends at or below the middle of the apertured portion of the tube 1 in the ground. In its lower portion said conduit carries an externally sealingly mounted balloon body 7 which is inflatable into sealing engagement with the inner surface of the outer tube 1. Slightly above the body 7 this second conduit 4 supports a pressure inlet means 6 so as to form a second ejector. Both pressure inlet means 5, 6 and the balloon body 7 are connected with suitable pressure sources. In the case of forming an oxidation zone said pressure fluids consist of air supplied from e.g. a compressor, while in a reduction process the pressure fluid for the ejectors consists of water or water solution from a suitable, not-illustrated pump, while the balloon body 7 still is connected with a source of pressurized air through a hose 10.

The circulation vessel 2 has a smoothly rounded shape for improved through-flow and hence reduced risks for the occurrence of deposits on the inner surface of said vessel. The vessel 2 furthermore can be provided with a bent vent pipe 8 the opening cross section being controllable by means of a valve device 9.

The conduits 3 and 4 preferably consist to a great extent of plastic hoses.

FIG. 1 illustrates an example of the location of wells with well pipes A and B between which are to be formed an oxidation and precipitation zone or a reduction zone and in which tubes the inventive device now is intended to be used in order to create the desired and active circulation circuits in the aquifer. Four such circuits are disclosed with lines and arrows representing flow paths in the four circuits I, II, III and IV.

The device described above operates as follows. Presupposing that the balloon body 7 is inflated and thus sealingly engages the inner surface of the outer tube 1 pressurized air or water is supplied to the upper ejector or pressure inlet means 5 and water is then pumped upwardly into the circulation vessel 2 for being deaerated. The outlet valve 9 of the vent pipe 8 of the vessel 2 is restricted to a suitable extent. The water then is pressed downwardly through the conduit 4 into the lower portion of the tube 1 below the balloon body 7. From there, the water is pressed into the surrounding ground.

Inversely, air or water/water solution may be supplied at the lower ejector or pressure inlet means 6 for pressing water upwardly through the conduit 4 to the vessel 2 for being deaerated. The water then flows back through the conduit 3 for being pressed out into the ground water in the ground above the body 7.

Should non-desired deposits occur within the tube and the conduits 3 and 4, a flushing may easily be carried out after emptying the balloon body 7 of air.

What is claimed is:

1. A device for creating in an aquifer an oxidation and precipitation zone or a reduction zone between a number of injection wells arranged around one or more extraction wells for purified water, wherein the reduction zone is intended for in situ precipitation or reduction of substances not desired in the ground water, and the reduction zone is created intermittently between each pair of adjacent wells, the device comprising:

each injection well comprising an outer tube having a ground water carrying portion along its length, at least at the ground-water-carrying portion of its length the outer tube is apertured and water-pervious, a circulation vessel mounted at the upper end of the outer tube, a first conduit which extends downwardly within the outer tube from the circulation vessel and the first conduit ending at the height of the upper portion of the aquifer;

the outer tube having a mouth, and slightly above the mouth the outer tube having a pressure inlet so as to form an upper ejector;

a second conduit which extends downwardly from the circulation vessel within the outer tube, the second conduit ending at or below the middle of the aquifer and having a lower and toward the lower end, the second conduit supporting an externally sealingly mounted balloon body, which is inflatable into sealing engagement with the inner surface of the outer tube closely above the balloon body; the second conduit carrying a pressure inlet to form a second ejector;

both of the pressure inlets and the balloon body being connected with one or more pressure sources.

2. A device according to claim 1, wherein the circulation vessel has a smoothly rounded shape for improved through-flow and hence reduced risk of precipitation on the inner surface of the vessel.

3. A device according to claim 1, further comprising a bent vent tube to the circulation vessel, the vent tube having a mouth with a cross section and a valve for controlling the cross section of the mouth.

4. A device according to claim 1, wherein the conduits have a great portion of their length consisting of a plastic hose.

5. A device according to claim 1, wherein in an oxidation process the pressure fluid consists of air.

6. A device according to claim 1, wherein in a reduction process the pressure fluid to the inlets consists of water or a similar suitable fluid and the device further comprising a pump for the fluid.

7. A device according to claim 1, wherein the device is operable for (i) introducing oxygen, oxygen-containing gas or an oxygen-releasing substance into the water in both wells when creating an oxidation and precipitation zone, or introducing into the water in both wells an oxygen-consuming substance when creating a reduction zone, and (ii) pumping the water in one of the wells from below upwards while pumping the water in the other well from above downwards whereby a circulation circuit is formed in the aquifer between the two wells.

* * * * *